(12) United States Patent
Duncan et al.

(10) Patent No.: US 9,994,119 B2
(45) Date of Patent: Jun. 12, 2018

(54) MANAGEMENT OF A REMOTE ELECTRIC VEHICLE TRACTION BATTERY SYSTEM

(71) Applicant: Elwha LLC, Bellevue, WA (US)

(72) Inventors: William D. Duncan, Kirkland, WA (US); Roderick A. Hyde, Redmond, WA (US); Jordin T. Kare, Seattle, WA (US)

(73) Assignee: Elwha LLC

( * ) Notice: Subject to any disclaimer, the term of this patent is extended or adjusted under 35 U.S.C. 154(b) by 774 days.

(21) Appl. No.: 13/900,337

(22) Filed: May 22, 2013

(65) Prior Publication Data
US 2014/0351107 A1 Nov. 27, 2014

(51) Int. Cl.
*B60L 11/18* (2006.01)
*G06Q 30/06* (2012.01)
*G06Q 30/04* (2012.01)
*G08B 21/00* (2006.01)

(52) U.S. Cl.
CPC ....... *B60L 11/1861* (2013.01); *B60L 11/1864* (2013.01); *B60L 11/1868* (2013.01); *G06Q 30/04* (2013.01); *G06Q 30/0645* (2013.01); *Y02T 10/7005* (2013.01); *Y02T 10/7044* (2013.01); *Y02T 10/7061* (2013.01); *Y02T 10/7066* (2013.01); *Y02T 90/16* (2013.01)

(58) Field of Classification Search
CPC ...... G06Q 30/04; G06Q 20/102; G06Q 40/10; G06Q 40/02; G06Q 40/00
USPC .......................................................... 705/34
See application file for complete search history.

(56) References Cited

U.S. PATENT DOCUMENTS

| 5,349,535 | A | * | 9/1994 | Gupta | ................ | B60L 11/1818 |
| | | | | | | 320/106 |
| 5,606,242 | A | | 2/1997 | Hull et al. | | |
| 5,850,351 | A | | 12/1998 | Lotfy et al. | | |
| 6,031,354 | A | | 2/2000 | Wiley et al. | | |

(Continued)

FOREIGN PATENT DOCUMENTS

| JP | 2010097388 A | 4/2010 |
| WO | WO 2010/051477 A2 | 5/2010 |

OTHER PUBLICATIONS

PCT International Search Report; International App. No. PCT/US2014/038975; dated Sep. 19, 2014; pp. 1-3.

*Primary Examiner* — Garcia Ade

(57) ABSTRACT

Described embodiments include a battery manager system and a method. The battery manager system includes an asset database that includes records related to at least two rechargeable traction battery pack systems and a management criteria respectively assigned to each rechargeable traction battery pack system. The system includes a compliance module configured to evaluate a fraction battery pack status report pertaining to an identified rechargeable traction battery pack system of the at least two rechargeable traction battery pack systems (hereafter "the identified rechargeable fraction battery pack system"), the evaluation with respect to the management criteria assigned to the identified rechargeable fraction battery pack system. The system includes a manager module configured to generate a management instruction responsive to the evaluation of the battery status report. The system includes a communication system configured to communicate with the identified rechargeable traction battery pack system.

21 Claims, 10 Drawing Sheets

(56) References Cited

U.S. PATENT DOCUMENTS

| | | | |
|---|---|---|---|
| 8,473,114 | B2 | 6/2013 | Bauerle et al. |
| 8,527,114 | B2 | 9/2013 | Ferguson et al. |
| 8,751,062 | B2 | 6/2014 | Van Wiemeersch |
| 8,849,499 | B2 | 9/2014 | Profitt-Brown et al. |
| 2003/0209375 | A1 | 11/2003 | Suzuki et al. |
| 2009/0021385 | A1 | 1/2009 | Kelty et al. |
| 2009/0043476 | A1 | 2/2009 | Saito et al. |
| 2009/0143935 | A1* | 6/2009 | Hsu ................. G07C 5/008 701/31.4 |
| 2010/0121588 | A1 | 5/2010 | Elder et al. |
| 2010/0230188 | A1 | 9/2010 | Nguyen |
| 2010/0301810 | A1 | 12/2010 | Biondo et al. |
| 2012/0049793 | A1* | 3/2012 | Ross ................. H01M 10/44 320/109 |

* cited by examiner

MANAGEMENT OF A REMOTE ELECTRIC VEHICLE TRACTION BATTERY SYSTEM

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related applications," if any, listed below.

PRIORITY APPLICATIONS

None.

RELATED APPLICATIONS

U.S. patent application Ser. No. 13/900,325, entitled MANAGED ELECTRIC VEHICLE TRACTION BATTERY SYSTEM, naming William D. Duncan, Roderick A. Hyde, Jordin T. Kare as inventors, filed 22 May 2013, is related to the present application.

If the listings of applications provided above are inconsistent with the listings provided via an ADS, it is the intent of the Applicant to claim priority to each application that appears in the Priority applications section of the ADS and to each application that appears in the Priority applications section of this application.

All subject matter of the Priority applications and the Related applications and of any and all parent, grandparent, great-grandparent, etc. applications of the Priority applications and the Related applications, including any priority claims, is incorporated herein by reference to the extent such subject matter is not inconsistent herewith.

SUMMARY

For example, and without limitation, an embodiment of the subject matter described herein includes a battery manager system. The system includes an asset database that includes records related to at least two rechargeable traction battery pack systems and a management criteria respectively assigned to each rechargeable traction battery pack system. The system includes a compliance module configured to evaluate a traction battery pack status report pertaining to an identified rechargeable traction battery pack system of the least two rechargeable traction battery pack systems (hereafter "the identified rechargeable traction battery pack system"), the evaluation with respect to the management criteria assigned to the identified rechargeable traction battery pack system. The system includes a manager module configured to generate a management instruction responsive to the evaluation of the battery status report. The system includes a communication system configured to communicate with the identified rechargeable traction battery pack system.

For example, and without limitation, an embodiment of the subject matter described herein includes a method. The method includes receiving a traction battery pack status report pertaining to an identified rechargeable traction battery pack system. The method includes retrieving a management criteria assigned to the identified rechargeable traction battery pack system from an asset database that includes at least two identified rechargeable traction battery pack systems and a management criteria respectively assigned to each identified rechargeable traction battery pack system. The method includes evaluating the traction battery pack status report with respect to the management criteria assigned to the identified rechargeable traction battery pack system. The method includes issuing a management instruction responsive to the evaluation of the battery status report. The method includes communicating the management instruction to the identified rechargeable traction battery pack system.

For example, and without limitation, an embodiment of the subject matter described herein includes a battery manager system. The system includes means for receiving a traction battery pack status report pertaining to an identified rechargeable traction battery pack system. The system includes means for retrieving a management criteria assigned to an identified rechargeable traction battery pack system from an asset database that includes at least two identified rechargeable fraction battery pack systems and a management criteria respectively assigned to each identified rechargeable traction battery pack system. The system includes means for evaluating the traction battery pack status report with respect to the management criteria assigned to the identified rechargeable traction battery pack system. The system includes means for issuing a management instruction responsive to the evaluation of the battery status report. The system includes means for communicating the management instruction to the identified rechargeable traction battery pack system.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
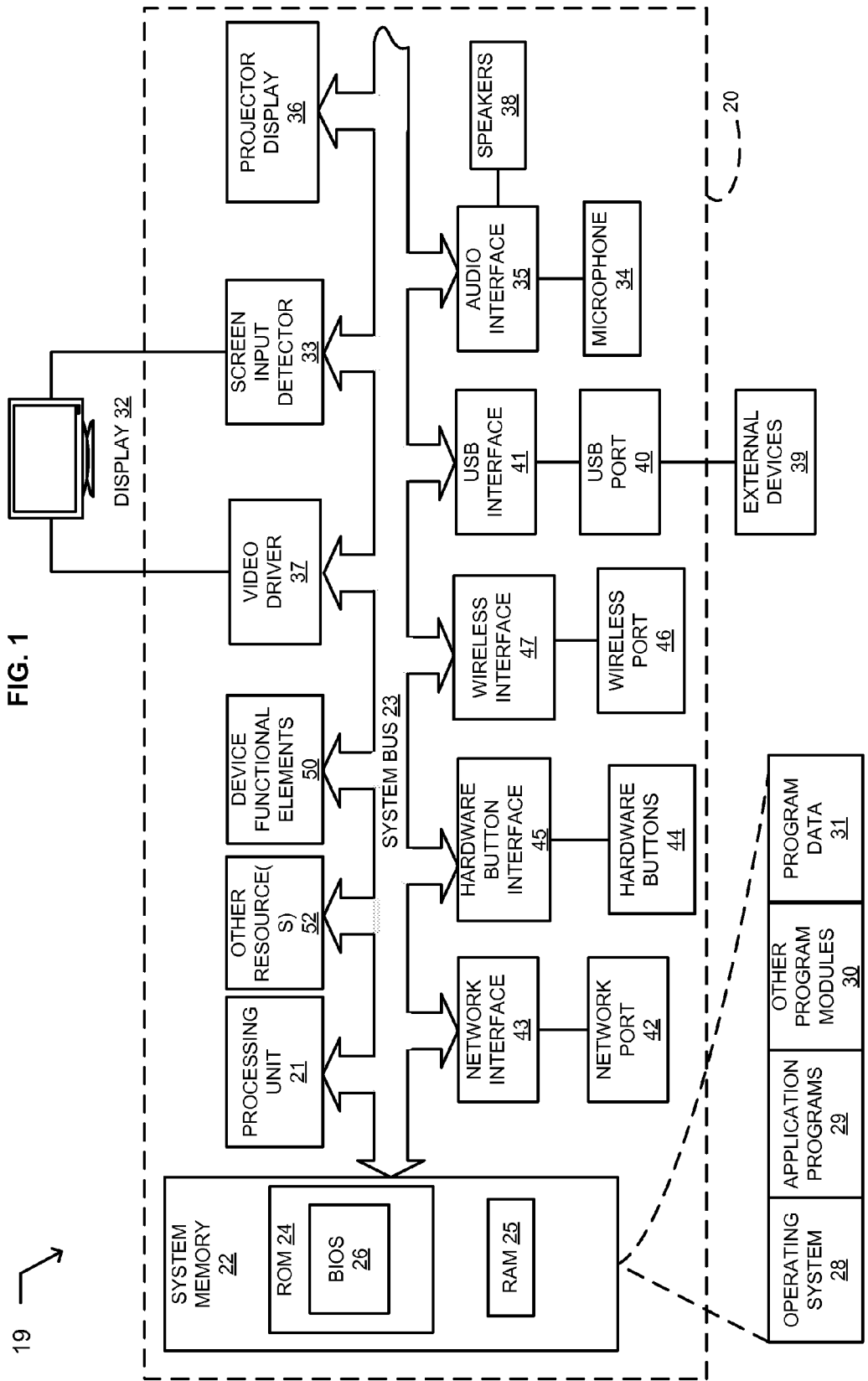
FIG. 1 illustrates an example embodiment of a thin computing device in which embodiments may be implemented.

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various implementations by which processes and/or systems and/or other technologies described herein can be effected (e.g., hardware, software, and/or firmware), and that the preferred implementation will vary with the context in which the processes and/or systems and/or other technologies are deployed. For example, if an implementer determines that speed and accuracy are paramount, the implementer may opt for a mainly hardware and/or firmware implementation; alternatively, if flexibility is paramount, the implementer may opt for a mainly software implementation; or, yet again alternatively, the implementer may opt for some combination of hardware, software, and/or firmware. Hence, there are several possible implementations by which the processes and/or devices and/or other technologies described herein may be effected, none of which is inherently superior to the other in that any implementation to be utilized is a choice dependent upon the context in which the implementation will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to implement an operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described below. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, module, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will also recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will further recognize that at least a portion of the devices and/or processes described herein can be integrated into an image processing system. A typical image processing system may generally include one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch-sensitive screen or display surface, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will likewise recognize that at least some of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch-sensitive screen or display surface, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Figure 2:
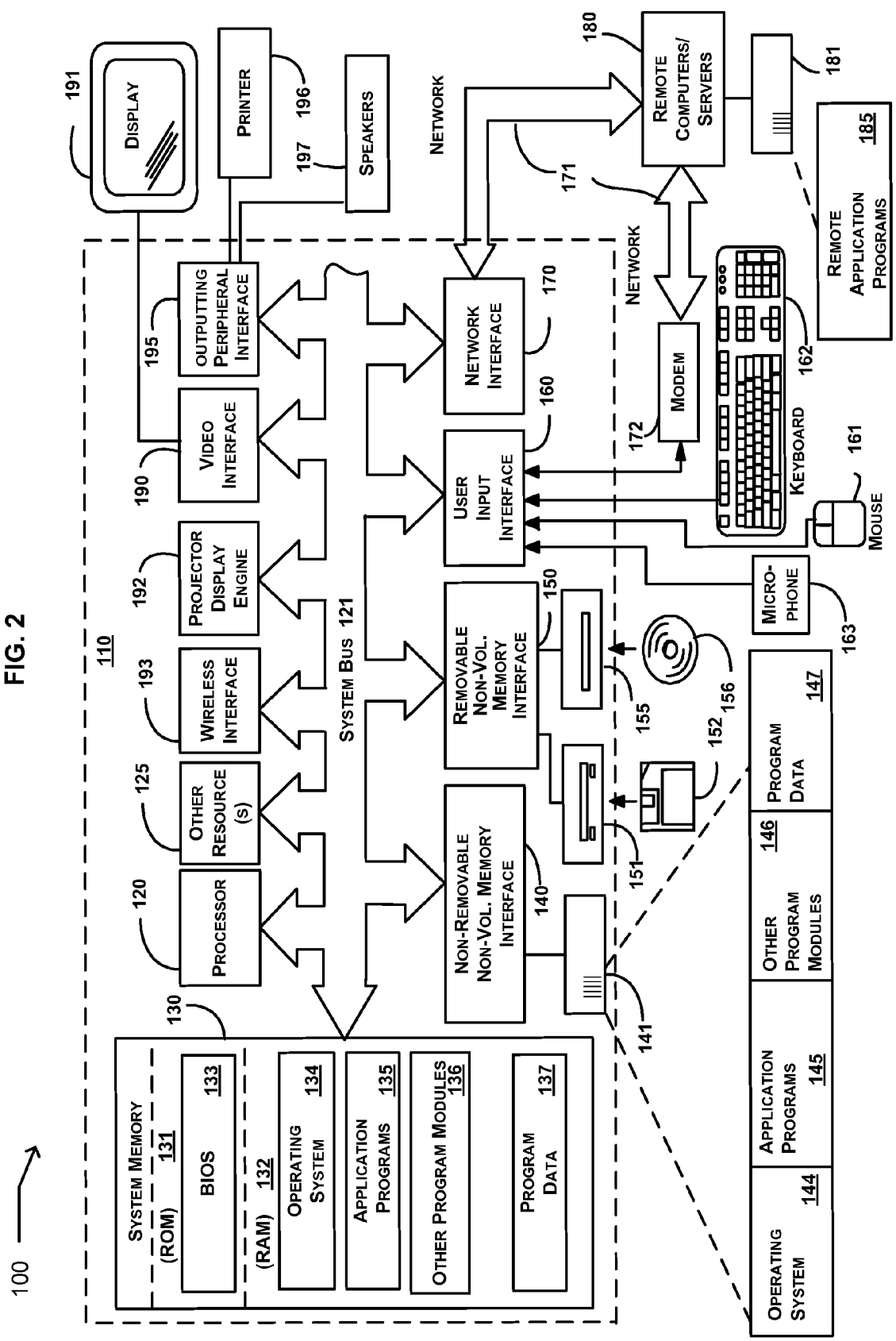
FIG. 2 illustrates an example embodiment of a general-purpose computing system in which embodiments may be implemented.

FIGS. 1 and 2 provide respective general descriptions of several environments in which implementations may be implemented. FIG. 1 is generally directed toward a thin computing environment 19 having a thin computing device 20, and FIG. 2 is generally directed toward a general purpose computing environment 100 having general purpose computing device 110. However, as prices of computer components drop and as capacity and speeds increase, there is not always a bright line between a thin computing device and a general purpose computing device. Further, there is a continuous stream of new ideas and applications for environments benefited by use of computing power. As a result, nothing should be construed to limit disclosed subject matter herein to a specific computing environment unless limited by express language.

FIG. 1 and the following discussion are intended to provide a brief, general description of a thin computing environment 19 in which embodiments may be implemented. FIG. 1 illustrates an example system that includes a thin computing device 20, which may be included or embedded in an electronic device that also includes a device functional element 50. For example, the electronic device may include any item having electrical or electronic components playing a role in a functionality of the item, such as for example, a refrigerator, a car, a digital image acquisition device, a camera, a cable modem, a printer an ultrasound device, an x-ray machine, a non-invasive imaging device, or an airplane. For example, the electronic device may include any item that interfaces with or controls a functional element of the item. In another example, the thin computing device may be included in an implantable medical apparatus or device. In a further example, the thin computing device may be operable to communicate with an implantable or implanted medical apparatus. For example, a thin computing device may include a computing device having limited resources or limited processing capability, such as a limited resource computing device, a wireless communication device, a mobile wireless communication device, a smart phone, an electronic pen, a handheld electronic writing device, a scanner, a cell phone, a smart phone (such as an Android® or iPhone® based device), a tablet device (such as an iPad®) or a Blackberry® device. For example, a thin computing device may include a thin client device or a mobile thin client device, such as a smart phone, tablet, notebook, or desktop hardware configured to function in a virtualized environment.

The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 or RAM 25, including an operating system 28, one or more application programs 29, other program modules 30 and program data 31.

A user may enter commands and information into the computing device 20 through one or more input interfaces. An input interface may include a touch-sensitive screen or display surface, or one or more switches or buttons with suitable input detection circuitry. A touch-sensitive screen or display surface is illustrated as a touch-sensitive display 32 and screen input detector 33. One or more switches or buttons are illustrated as hardware buttons 44 connected to the system via a hardware button interface 45. The output circuitry of the touch-sensitive display 32 is connected to the system bus 23 via a video driver 37. Other input devices may include a microphone 34 connected through a suitable audio interface 35, or a physical hardware keyboard (not shown). Output devices may include the display 32, or a projector display 36.

In addition to the display 32, the computing device 20 may include other peripheral output devices, such as at least one speaker 38. Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47 may be provided to facilitate communication with other peripheral devices, including other computers, printers, and so on (not shown). It will be appreciated that the various components and connections shown are examples and other components and means of establishing communication links may be used.

The computing device 20 may be primarily designed to include a user interface. The user interface may include a character, a key-based, or another user data input via the touch sensitive display 32. The user interface may include using a stylus (not shown). Moreover, the user interface is not limited to an actual touch-sensitive panel arranged for directly receiving input, but may alternatively or in addition respond to another input device such as the microphone 34. For example, spoken words may be received at the microphone 34 and recognized. Alternatively, the computing device 20 may be designed to include a user interface having a physical keyboard (not shown).

The device functional elements 50 are typically application specific and related to a function of the electronic device, and are coupled with the system bus 23 through an interface (not shown). The functional elements may typically perform a single well-defined task with little or no user configuration or setup, such as a refrigerator keeping food cold, a cell phone connecting with an appropriate tower and transceiving voice or data information, a camera capturing and saving an image, or communicating with an implantable medical apparatus.

In certain instances, one or more elements of the thin computing device 20 may be deemed not necessary and omitted. In other instances, one or more other elements may be deemed necessary and added to the thin computing device.

FIG. 2 and the following discussion are intended to provide a brief, general description of an environment in which embodiments may be implemented. FIG. 2 illustrates an example embodiment of a general-purpose computing system in which embodiments may be implemented, shown as a computing system environment 100. Components of the computing system environment 100 may include, but are not limited to, a general purpose computing device 110 having a processor 120, a system memory 130, and a system bus 121 that couples various system components including the system memory to the processor 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media. By way of further example, and not of limitation, computer-readable media may include a communication media.

Computer storage media includes volatile and nonvolatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. In a further embodiment, a computer storage media may include a group of computer storage media devices. In another embodiment, a computer storage media may include an information store. In another embodiment, an information store may include a quantum memory, a photonic quantum memory, or atomic quantum memory. Combinations of any of the above may also be included within the scope of computer-readable media.

Communication media may typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media may include wired media, such as a wired network and a direct-wired connection, and wireless media such as acoustic, RF, optical, and infrared media.

The system memory 130 includes computer storage media in the form of volatile and nonvolatile memory such as ROM 131 and RAM 132. A RAM may include at least one of a DRAM, an EDO DRAM, a SDRAM, a RDRAM, a VRAM, or a DDR DRAM. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by the processor 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" ® are well known in the art.

The computing device 110 may also include other removable/non-removable, volatile/nonvolatile computer storage media products. By way of example only, FIG. 2 illustrates a non-removable non-volatile memory interface (hard disk interface) 140 that reads from and writes for example to non-removable, non-volatile magnetic media. FIG. 2 also illustrates a removable non-volatile memory interface 150 that, for example, is coupled to a magnetic disk drive 151 that reads from and writes to a removable, non-volatile magnetic disk 152, or is coupled to an optical disk drive 155 that reads from and writes to a removable, non-volatile optical disk 156, such as a CD ROM. Other removable/non-removable, volatile/non-volatile computer storage media that can be used in the example operating environment include, but are not limited to, magnetic tape cassettes, memory cards, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies.

A user may enter commands and information into the computing device 110 through input devices such as a microphone 163, keyboard 162, and pointing device 161, commonly referred to as a mouse, trackball, or touch pad. Other input devices (not shown) may include at least one of a touch-sensitive screen or display surface, joystick, game pad, satellite dish, and scanner. These and other input devices are often connected to the processor 120 through a user input interface 160 that is coupled to the system bus, but may be connected by other interface and bus structures, such as a parallel port, game port, or a universal serial bus (USB).

A display 191, such as a monitor or other type of display device or surface may be connected to the system bus 121 via an interface, such as a video interface 190. A projector display engine 192 that includes a projecting element may be coupled to the system bus. In addition to the display, the computing device 110 may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The network logical connections depicted in FIG. 2 include a local area network (LAN) and a wide area network (WAN), and may also include other networks such as a personal area network (PAN) (not shown). Such networking environments are commonplace in offices, enterprise-wide computer networks, intranets, and the Internet.

When used in a networking environment, the computing system environment 100 is connected to the network 171 through a network interface, such as the network interface 170, the modem 172, or the wireless interface 193. The network may include a LAN network environment, or a WAN network environment, such as the Internet. In a networked environment, program modules depicted relative to the computing device 110, or portions thereof, may be stored in a remote memory storage device. By way of example, and not limitation, FIG. 2 illustrates remote application programs 185 as residing on memory storage device 181. It will be appreciated that the network connections shown are examples and other means of establishing a communication link between the computers may be used.

In certain instances, one or more elements of the computing device 110 may be deemed not necessary and omitted. In other instances, one or more other elements may be deemed necessary and added to the computing device.

Figure 3:
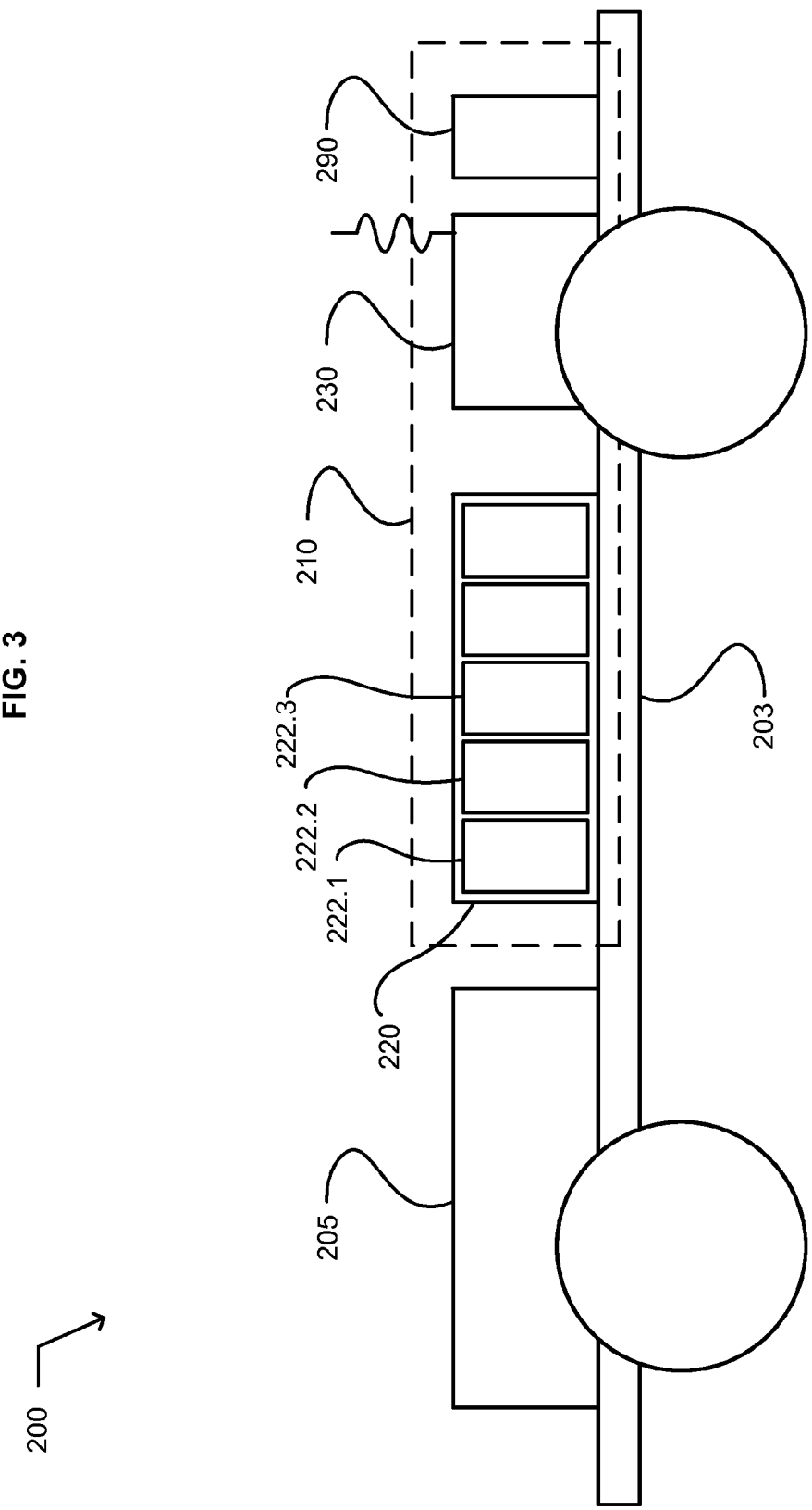
FIG. 3 illustrates an example environment 200 in which embodiments may be implemented.

FIG. 3 illustrates an example environment 200 in which embodiments may be implemented. The environment includes an electric vehicle 203 propelled by an electric motor 205, sometimes called an electric fraction motor. In an embodiment, the vehicle may include an over the road vehicle, such as a neighborhood vehicle, car, truck, bus, or special purpose vehicle. In an embodiment, the vehicle may include an off-road vehicle. In an embodiment, the vehicle may include a hybrid vehicle. In an embodiment, the vehicle may include a fork lift or other industrial vehicle.

The environment 200 includes an electric vehicle battery system 210. The system includes a rechargeable traction battery pack 220 configured to supply electric power to a propulsion system, illustrated by the electric motor 205, of the vehicle 203. In an embodiment, the rechargeable traction battery pack includes a set of any number of preferably identical batteries or individual battery cells. For example, FIG. 3 illustrates the individual batteries as individual battery 222.1, individual battery 222.2, and individual battery 222.3. The batteries may be configured in a series, parallel or a mixture of both to deliver the desired voltage, capacity, or power density. Battery technology may be developed by companies other than the companies that manufacture electrically propelled vehicles. For example, a current model of the Toyota Prius uses a traction battery that is a sealed 38-module nickel metal hydride (NiMH) battery pack providing 273.6 volts, 6.5 A·h capacity supplied by Japan's Panasonic EV Energy Co. The battery pack is normally charged between 40-60% of maximum capacity to prolong battery life as well as allow headroom for regenerative braking. A discharge below 20% of capacity is considered an adverse event. Additionally, batteries have a different lifecycle than the vehicles they power. As a result, the rechargeable traction battery pack may be owned by an entity different from the entity that owns the vehicle. The vehicle and the traction battery pack may be leased to an operator of the vehicle under separate leases, each having different terms, conditions, and payment schedules.

Figure 4:
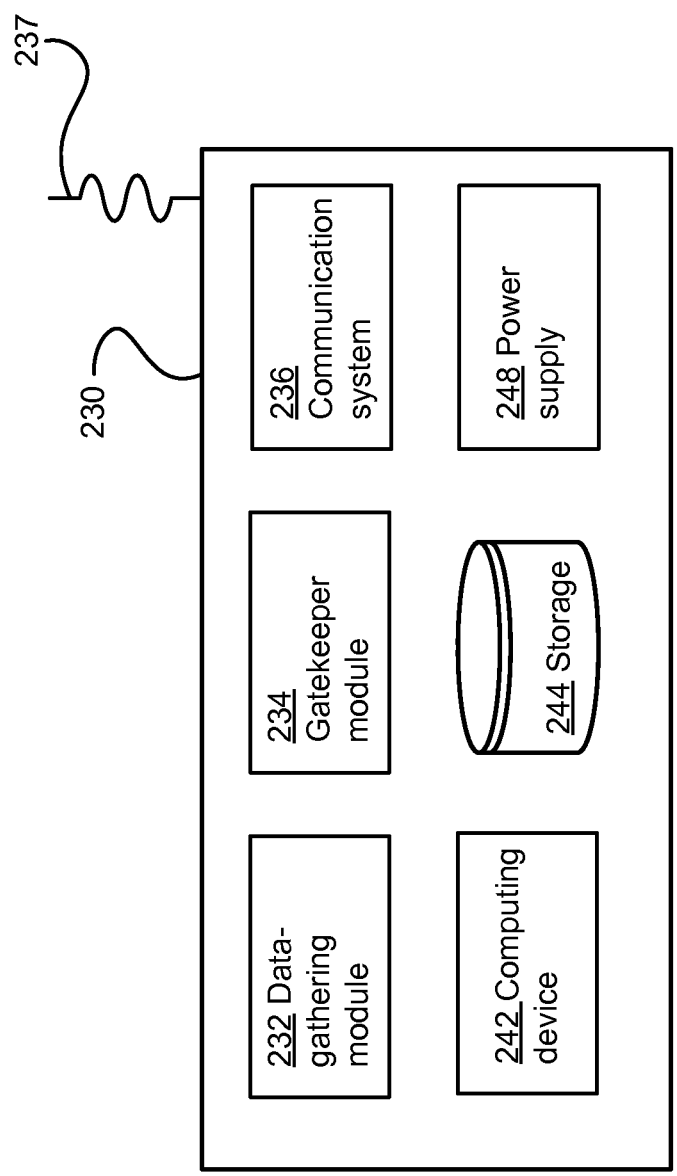
FIG. 4 illustrates an electronics package 230 of the system 210 of FIG. 3.

FIG. 4 illustrates an electronics package 230 of the system 210 of FIG. 3. The electronics package includes a data-gathering module 232 configured to monitor or test an aspect of the traction battery pack 220 and in response to generate a traction battery pack status report. The electronics package includes a gatekeeper module 234 configured to permit or deny the rechargeable traction battery pack (i) supplying electric power to the propulsion system 205 or (ii) receiving a recharge. The permit or deny is responsive to a management instruction issued by a remote battery manager system. A remote battery manager system is described in conjunction with FIG. 8. The electronics package includes a communication system 236 configured to communicate with the remote battery manager. For example, the communication system transmits the fraction battery pack status report to and receives the management instruction from the remote battery manager. In an embodiment, the electronics package includes a computing device 242. In an embodiment, the computing device may be at least substantially similar to the computing environment 19 of FIG. 1 that includes the thin computing device 20, or may be at least similar to the thin computing device 20. In an embodiment, the computing device may be at least substantially similar to the general purpose computing environment 100 having general purpose computing device 110, or may be at least substantially similar to the general purpose computing device 110. In an embodiment, the electronics package includes a computer storage media 244. In an embodiment, the computer storage media may be at least substantially similar to the computer storage media described in conjunction with the general purpose computing device 110 of FIG. 2. In an embodiment, the electronics package includes a power supply 248.

In an embodiment, the rechargeable traction battery pack 220 includes a rechargeable traction battery pack configured to supply electric power to a propulsion system of the vehicle 203, illustrated by the electric motor 205. In an embodiment, the rechargeable traction battery pack includes a rechargeable fuel cell configured to supply electric power to a propulsion system of the vehicle. In an embodiment, the rechargeable fraction battery pack is permanently installed in the vehicle. The permanently installed rechargeable battery may be dismounted and replaced, for example like a shock absorber, fuel tank, or engine may be dismounted and replaced. The battery installation is not structured for removal or dismounting in the ordinary course of using the fraction battery pack, i.e., not structured for being readily swappable or dismountable.

In an embodiment, the data-gathering module 232 is configured to monitor or test discharge rates or discharge levels, or recharge rates or recharge levels of the traction battery pack 220. In an embodiment, the data-gathering module is configured to monitor or test an abnormal condition or state of the traction battery pack. In an embodiment, the data-gathering module is configured to monitor or test a temperature of one or more cells of the traction battery pack. In an embodiment, the data-gathering module is configured to monitor or test a charge-state indicator of one or more cells of the traction battery pack. For example, a charge state may include a minimum or a maximum charge state of the traction battery pack. For example, a charge state may include a usage history over time, or charging events. In an embodiment, the data-gathering module is configured to monitor or test a parameter of the traction battery pack indicative of a remaining usable life. In an embodiment, the data-gathering module is configured to monitor electric power supplied to the vehicle propulsion system. In an embodiment, the data-gathering module is configured to gather data indicative of an electric power usage pattern. In an embodiment, the data-gathering module is further configured to gather data indicative of an attempt to override or circumvent a denial of (i) supplying electric power to the vehicle propulsion system or (ii) receiving a recharge imposed by the gatekeeper module 234. In an embodiment, the data-gathering module is further configured to include an identifier of the traction battery pack with the traction battery pack status report. In an embodiment, the data-gathering module is further configured to generate a traction battery pack status report in response to a schedule, an occurrence of an anomaly, a content of the battery pack status report, or a presence of the vehicle at a particular location. For example, a traction battery pack status report may be automatically generated nightly or monthly, in response to an event (i.e., when charging, or when a charge state is reached) (i.e., when discharging, or when a discharge state is reached), or in response to a location (i.e., when at or not at vehicle-owner's address).

In an embodiment, the data-gathering module is further configured to generate a traction battery pack status report in response to a violation of operational criteria established for the traction battery pack. For example, the report may be generated promptly, within one hour, or within one day of a violation of the operational criteria. For example, a violation may include a violation of discharge rate or limits, or violation of recharge rate or limits. For example, the violation may be reported on a yes or no basis, or on a score generated across multiple scored events. For example, if a scoring system is used, one or more violations may each be graded and a report generated when total score exceeds a criterion. For example, a score of 100 may indicate a full compliance, and a score of zero may indicate maximally bad. In an embodiment, the data-gathering module is further configured to include in the traction battery pack status report a current or previous location. For example, a location may be reported using GPS coordinates, or geographical reference, such as an address. In an embodiment, the data-gathering module may be implemented using hardware, and/or firmware. In an embodiment, the data-gathering module may be implemented using a computing device programmed by software.

In an embodiment, the gatekeeper module 234 further includes an electronically controlled switch configured to permit or deny the rechargeable traction battery pack 220 (i) supplying electric power to the vehicle propulsion system or (ii) receiving a recharge. In an embodiment, the gatekeeper module is further configured to deny the supplying or the recharging if a periodic authorizing management instruction is not received. For example, for continued operation of the rechargeable traction battery pack, the gatekeeper must receive authorization to continue operation on first of day or each week or month. Otherwise the gatekeeper goes into deny status. In an embodiment, the gatekeeper module is further configured to deny the supplying or the recharging if a receipt responsive to a transmitted battery pack status report is not received from the remote battery manager. For example, this embodiment would prevent a user from shutting off the communication system or refusing to relay signals to the remote battery manager system. In an embodiment, the gatekeeper module includes a decoder circuit configured to decode a management instruction generated by a remote battery manager system. In an embodiment, the gatekeeper module is hardened against tampering or removal from traction battery pack or from the vehicle 203. For example, the gatekeeper module may be hardened against tampering from short circuiting or disconnection from traction battery pack. For example, the gatekeeper module may be hardened against a physical removal by prying or hammering. For example, the gatekeeper module may be hardened against hacking or unauthorized reprogramming. In an embodiment, the gatekeeper module is further configured to permit supplying electric power to the vehicle propulsion system in a limp-home mode. For example, a limp-home-mode may limit vehicle top speed to 20 mph. In an embodiment, the gatekeeper module is further configured to permit supplying electric power to the electric motor 205 in a limp-home mode in response to another management instruction generated by the remote battery manager system. In an embodiment, the management instruction includes a management instruction issued by a remote battery manager system responsive to the battery pack status report. In an embodiment, the gatekeeper module may be implemented using hardware, and/or firmware. In an embodiment, the gatekeeper module may be implemented using a computing device programmed by software.

In an embodiment, the communication system 236 is further configured to encode and decode communications with the remote battery manager. In an embodiment, the communication system is configured to communicate with the remote battery manager over a private network, a public network, or a cellular phone. In an embodiment, the communication system is configured to communicate with the remote battery manager over a network access device owned or operated by a user or lessee of the rechargeable traction battery pack. For example, a user can receive a file containing the battery pack status report from the communication system and forward it via their email account or cellphone to the remote battery manager. In an embodiment, the communication system is further configured to communicate over a wireless communication link 237 or over wired communication link, for example, such by a plugin connector or other physical connector. In an embodiment, the communication system includes a standalone communication system or a vehicle-based communication system. In an embodiment, the communication system is configured to transmit the traction battery pack status report to the remote battery manager. In an embodiment, a frequency or schedule of the transmitting the traction battery status report is responsive to a compliance history with the management criteria assigned to the traction battery pack. For example, users having a poor compliance history can be required to generate or transmit the traction battery report more frequently than users with a good compliance history. For example, the compliance history may be scored across multiple scored events. For example, each event of the multiple events may be graded, and report generated when total score is below a threshold criterion. For example, a score of 100 may be indicative of a full compliance, and a score of zero may be indicative of maximally bad. In an embodiment, the communication system is configured to receive the management instruction from the remote battery manager. In an embodiment, the communication system is configured to receive the management instruction from the remote battery manager via a user interface. For example, the remote battery manager sends the user or lessee a code to input, such as a QRL code.

FIG. 4 illustrates an alternative embodiment of the electric vehicle battery system 210 that includes an on-board charging system 290 configured to recharge the rechargeable traction battery pack 220. In an embodiment, the on-board charging system is configured to recharge the rechargeable traction battery pack using electric power or fuel received from a source external to the vehicle. In an embodiment, the traction battery pack 220 has a first owner and the vehicle 203 has a second owner. In an embodiment, the traction battery pack is leased from the first owner. In an embodiment, the traction battery pack includes an identifier.

In an alternative embodiment, an electric vehicle battery system includes a rechargeable battery pack configured to supply electric power to a vehicle. The system includes a data-gathering module configured to monitor or test an aspect of the battery pack and in response to generate a battery pack status report. The system includes a gatekeeper module configured to permit or deny the rechargeable battery pack (i) supplying electric power to the system or (ii) receiving a recharge, the permit or deny in response to a management instruction issued by a remote battery manager system. The system includes a communication system configured to communicate with the remote battery manager. In an embodiment, the rechargeable battery pack is configured to supply electric power to a propulsion system of the vehicle. For example, the rechargeable battery pack may be configured to supply electric power to a propulsion system of a boat or ship. For example, the rechargeable battery pack may supply electric power to ferry boat or a submarine. In an embodiment, the rechargeable battery pack is configured to supply electric power to a system of a vehicle other than a propulsion system of the vehicle. For example, the rechargeable battery pack may be configured to supply electric power used by robot or machine to lift or maneuver a work piece. For example, the rechargeable battery pack may be configured to supply electric power to a system used by an aircraft or ship in conjunction with performance of its intended purpose, such an emergency backup power on an airplane.

Figure 5:
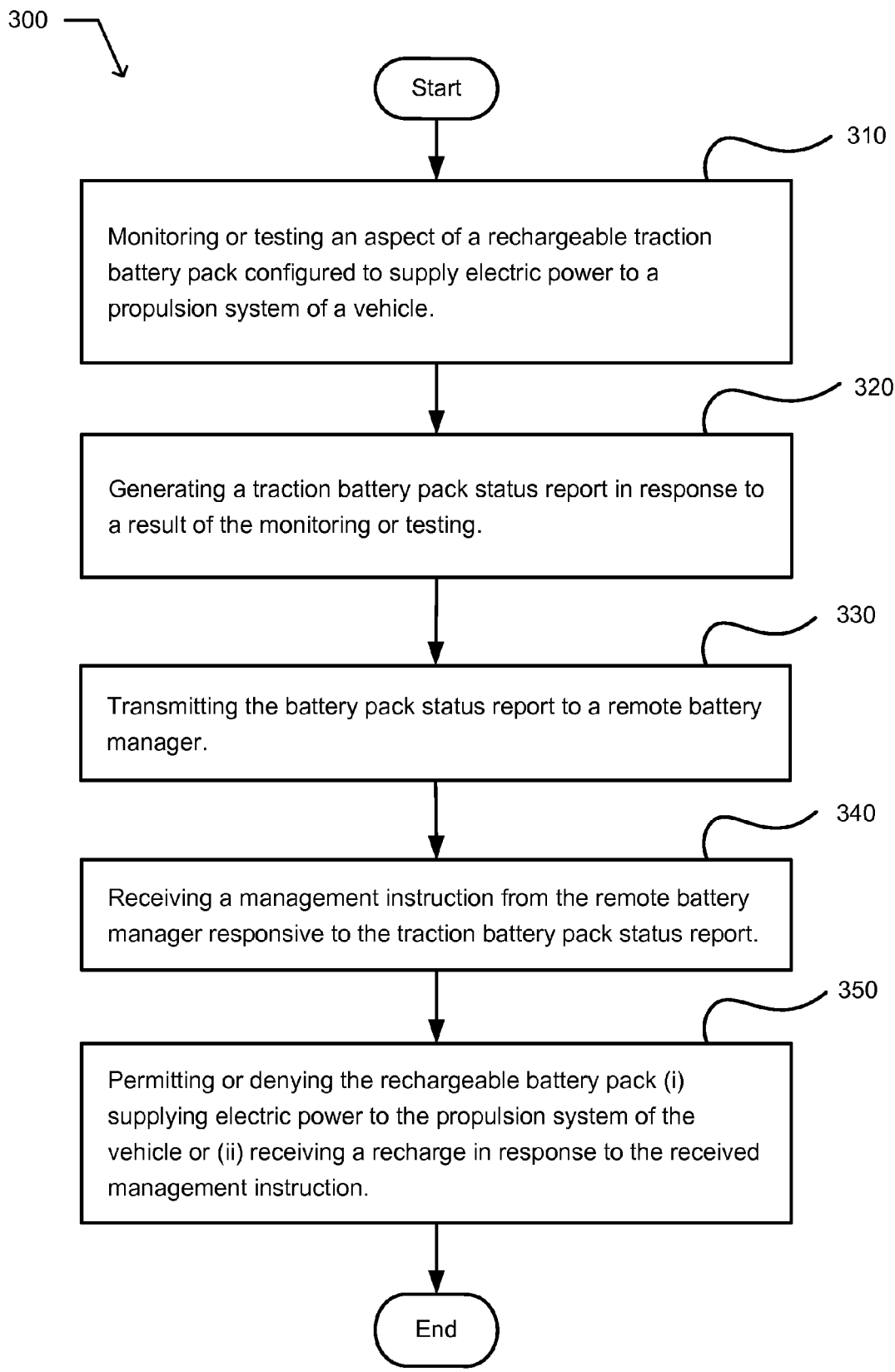
FIG. 5 illustrates an example operational flow 300.

FIG. 5 illustrates an example operational flow 300. After a start operation, the operational flow includes an observation operation 310. The observation operation includes monitoring or testing an aspect of a rechargeable traction battery pack configured to supply electric power to a propulsion system of a vehicle. In an embodiment, the observation operation may be implemented using the data gathering module 232 described in conjunction with FIG. 4. A reporting operation 320 includes generating a fraction battery pack status report in response to a result of the monitoring or testing. In an embodiment, the status report includes a summary of at least one aspect of the rechargeable battery pack over a stated period of time. In an embodiment, the reporting operation may be implemented using the data gathering module 232 described in conjunction with FIG. 4. An outgoing communication operation 330 includes transmitting the traction battery pack status report to a remote battery manager. In an embodiment, the outgoing communication operation may be implemented using the communication system 236 described in conjunction with FIG. 4. An incoming communication operation 340 includes receiving a management instruction from the remote battery manager responsive to the fraction battery pack status report. In an embodiment, the incoming communication operation may be implemented using the communication system 236 described in conjunction with FIG. 4. A gatekeeper operation 350 includes permitting or denying the rechargeable traction battery pack (i) supplying electric power to the propulsion system of the vehicle or (ii) receiving a recharge in response to the received management instruction. In an embodiment, the gatekeeper operation may be implemented using the gatekeeper module 438 described in conjunction with FIG. 6. The operational flow includes an end operation.

In an embodiment of the observation operation 310, the monitoring or testing an aspect further includes gathering data indicative of an attempt to override or circumvent a denial of (i) supplying electric power to the vehicle propulsion system or (ii) receiving a recharge imposed by the gatekeeper module. In an embodiment of the reporting operation 320, the generating a traction battery pack status report further includes generating a traction battery pack status report in response to a schedule, an occurrence of an anomaly, a content of the battery pack status report, or a presence of the vehicle at a particular location.

In an embodiment the fraction battery pack has a first owner and the vehicle has a second owner. In an embodiment, the traction battery pack is leased from the first owner. For example, the owner of the vehicle may be the lessee, or a purchaser of the vehicle may be the lessee.

Figure 6:
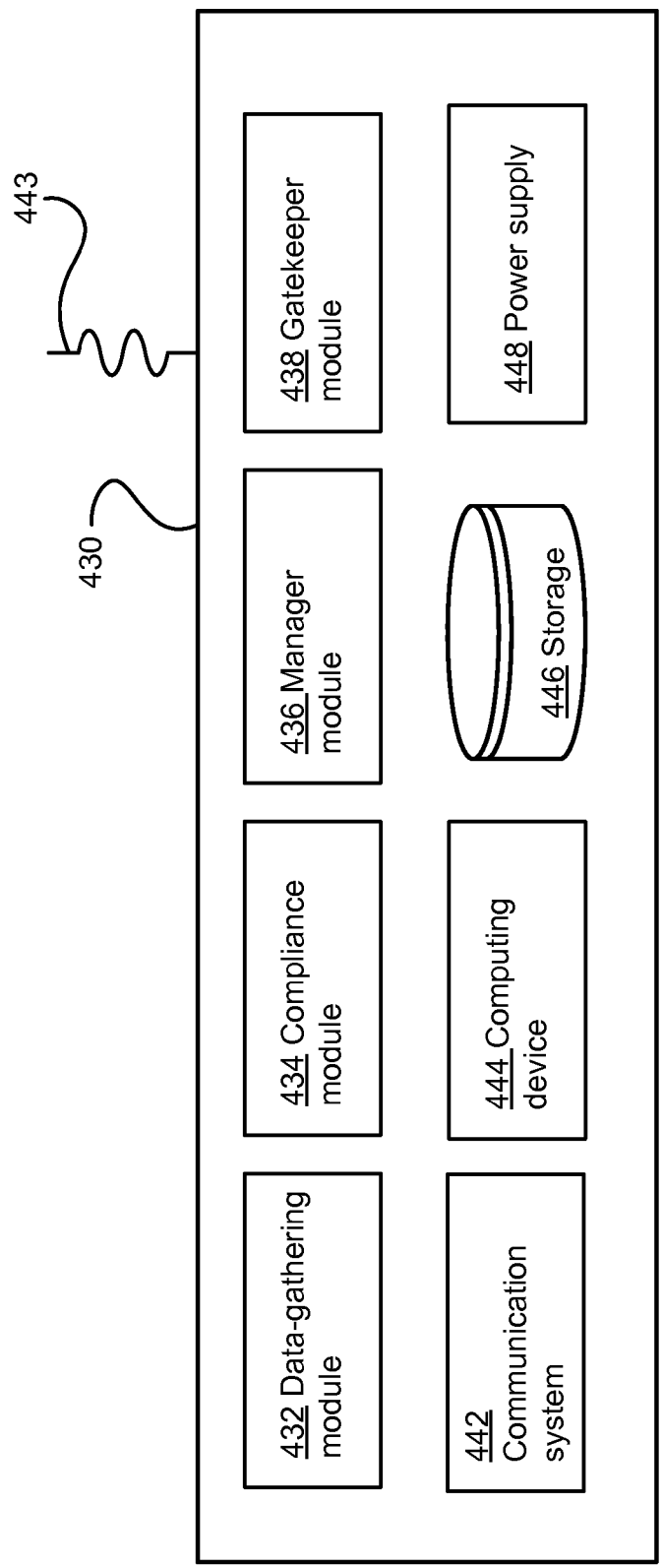
FIG. 6 illustrates an example electric vehicle battery system 430 in conjunction with FIG. 3.

FIG. 6, in conjunction with FIG. 3, illustrates an example electric vehicle battery system. The example electric vehicle battery system may be implemented in conjunction with the environment 200 and the electric vehicle 203 described in FIG. 3. The system includes the rechargeable traction battery pack 220 configured to supply electric power to a propulsion system of a vehicle, illustrated as the electric motor 205. The system includes an electronics package 430. The electronics package includes a data-gathering module 432 configured to monitor or test an aspect of the traction battery pack, and in response to generate a traction battery pack status report. The electronics package includes a compliance module 434 configured to evaluate the traction battery pack status report with respect to a management criteria assigned to the rechargeable traction battery pack. For example, the management criteria may be assigned by a lessor or owner of the battery pack, or by a manufacturer of the electric vehicle. In an embodiment, the wherein the management criteria includes at least one of a discharge rate limit, a discharge limit, a recharge rate limit, or a recharge limit. The electronics package includes a manager module 436 configured to issue a management instruction responsive to the evaluation of the battery status report. The electronics package includes a gatekeeper module 438 configured to permit or deny in response to the management instruction the rechargeable fraction battery pack (i) supplying electric power to the propulsion system or (ii) receiving a recharge. In an embodiment, the electronics package includes a computer readable storage 446.

In an embodiment, the electronics package 430 includes a communication system 442 configured to communicate information based on the fraction battery pack status report or the issued management instruction with a remote third-party battery manager. In an embodiment, the communication system is configured to communicate wirelessly 443 with a remote third-party battery manager. In an embodiment, the compliance module 434 is configured to evaluate the traction battery pack status report with respect to (i) a management criteria assigned to the rechargeable traction battery pack and (ii) a compliance with a lease payment term received from the remote third-party battery manager. In an embodiment, the management criteria include an updated management criteria received from a remote third-party battery manager. For example, updated management criteria may include a modified, updated, or replacement management criteria. In an embodiment, the traction battery pack 220 has a first owner and the vehicle 203 has a second owner. In an embodiment, the traction battery pack is leased from the first owner.

In an embodiment, the electronics package 430 includes a computing device 444. In an embodiment, the computing device may be at least substantially similar to the computing environment 19 of FIG. 1 that includes the thin computing device 20, or may be at least similar to the thin computing device 20. In an embodiment, the computing device may be at least substantially similar to the general purpose computing environment 100 having general purpose computing device 110, or may be at least substantially similar to the general purpose computing device 110. In an embodiment, the electronics package includes a computer storage media 244. In an embodiment, the computer storage media may be at least substantially similar to the computer storage media described in conjunction with the general purpose computing device 110 of FIG. 2. In an embodiment, the electronics package includes a power supply 448.

Figure 7:
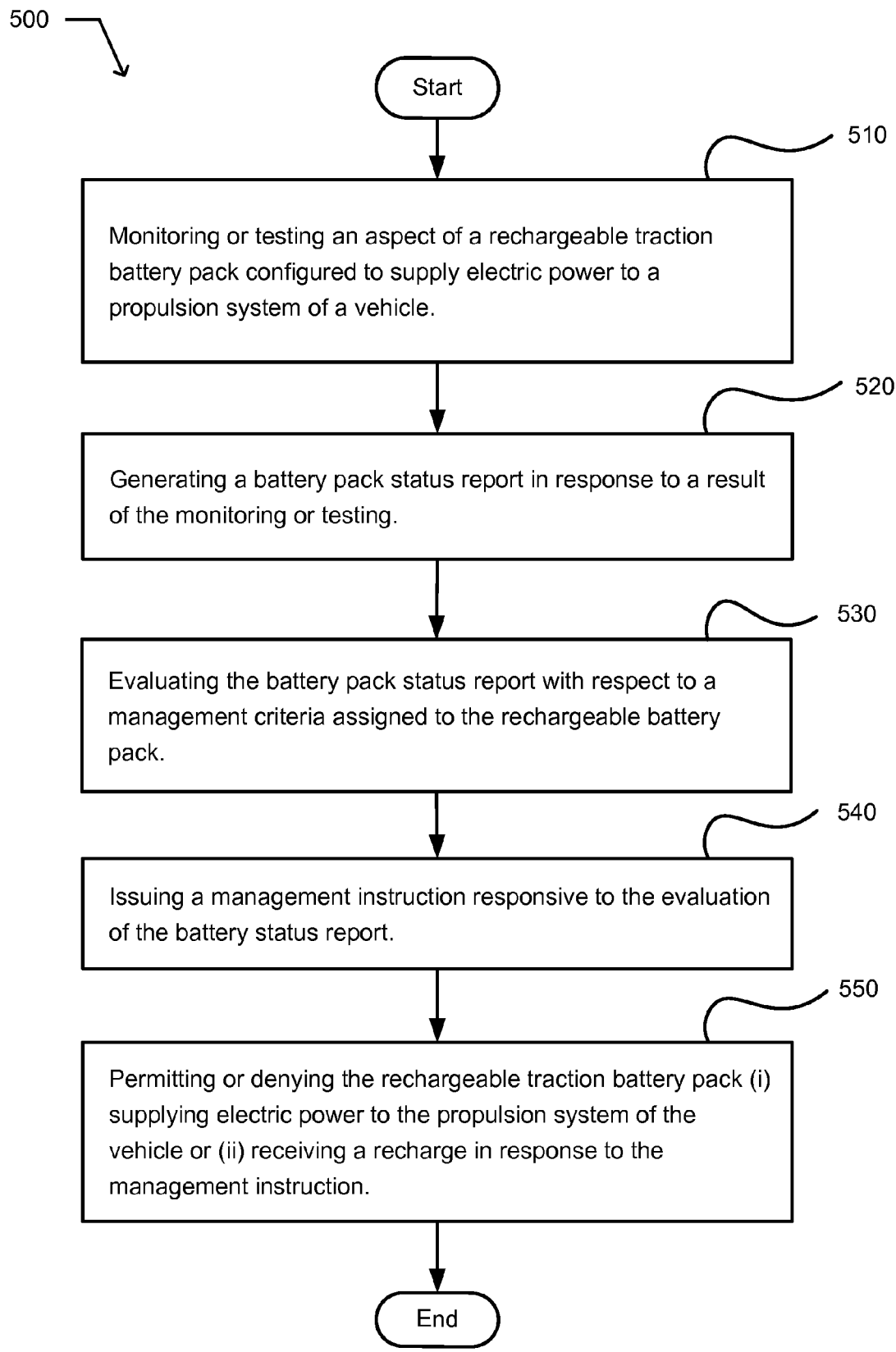
FIG. 7 illustrates an example operational flow 500.

FIG. 7 illustrates an example operational flow 500. After a start operation, the operational flow includes an observation operation 510. The observation operation includes monitoring or testing an aspect of a rechargeable traction battery pack configured to supply electric power to a propulsion system of a vehicle. In an embodiment, the observation operation may be implemented using the data-gathering module 432 described in conjunction with FIG. 6. A reporting operation 520 includes generating a fraction battery pack status report in response to a result of the monitoring or testing. In an embodiment, the reporting operation may be implemented using the data-gathering module 432 described in conjunction with FIG. 6. A evaluation operation 530 includes evaluating the traction battery pack status report with respect to a management criteria assigned to the rechargeable fraction battery pack. In an embodiment, the evaluation operation may be implemented using the compliance module 434 described in conjunction with FIG. 6. A compliance operation 540 includes issuing a management instruction responsive to the evaluation of the battery status report. In an embodiment, the compliance operation may be implemented using the manager module 436 described in conjunction with FIG. 6. A gatekeeper operation 550 includes permitting or denying the rechargeable traction battery pack (i) supplying electric power to the propulsion system of the vehicle or (ii) receiving a recharge in response to the management instruction. In an embodiment, the gatekeeper operation may be implemented using the gatekeeper module 438 described in conjunction with FIG. 6. The operational flow includes an end operation.

Figure 8:
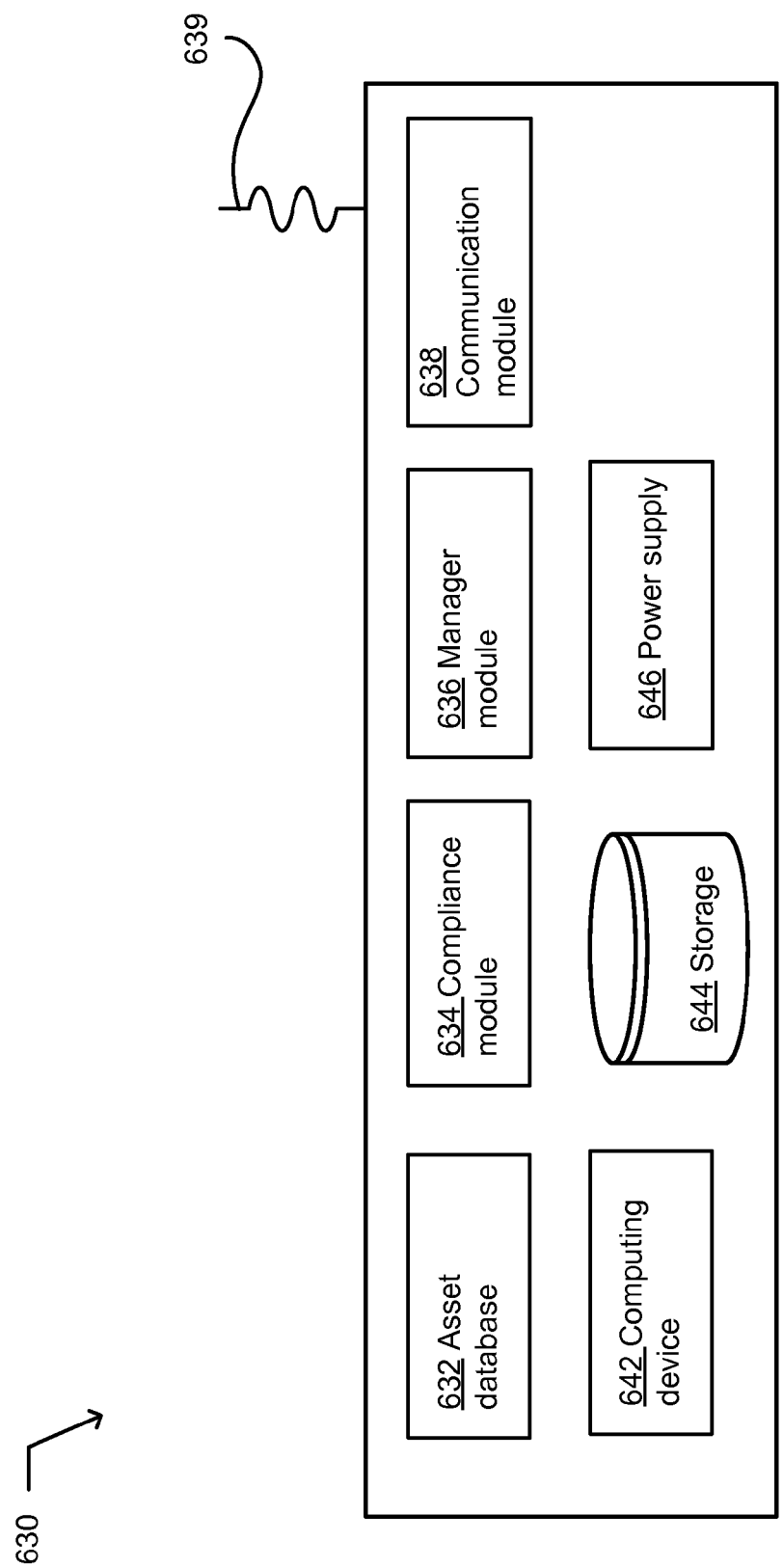
FIG. 8 illustrates an example battery manager system 630.

FIG. 8 illustrates an example battery manager system 630. In an embodiment, the battery manager system is configured to interact with the electric vehicle battery system 210 described in conjunction with FIG. 3. The battery manager system includes an asset database 632. The asset database includes records related to at least two rechargeable traction battery pack systems, and a management criteria respectively assigned to each rechargeable traction battery pack system. The battery manager includes a compliance module 634 configured to evaluate a traction battery pack status report pertaining to an identified rechargeable traction battery pack system of the least two identified rechargeable traction battery pack systems (hereafter "the identified rechargeable fraction battery pack system"). The evaluation is conducted with respect to the management criteria assigned to the identified rechargeable traction battery pack system. The battery manager includes a manager module 636 configured to generate a management instruction responsive to the evaluation of the battery status report. The battery manager includes a communication system 638 configured to communicate with the identified rechargeable traction battery pack system. In an embodiment, the communication system is configured to communicate wirelessly 639 with a remote third-party battery manager. In an embodiment, the communication system is configured to receive the traction battery pack status report from and transmit the management instruction to a remote electric vehicle battery system, such as the electric vehicle battery system 210 described in conjunction with FIG. 3. In an embodiment, the traction battery pack status report is received from a remote electric vehicle battery system. For example, the traction battery pack status report may be received from the electric vehicle battery system.

In an embodiment, the compliance module 634 is further configured to evaluate an absence of a traction battery pack status report pertaining to the identified rechargeable traction battery pack system with respect to the management criteria. In an embodiment, the management instruction generated by the manager module 636 includes an instruction denying the identified rechargeable traction battery pack supplying electric power to the propulsion system. The denial is in response to an evaluation of the absence of the traction battery pack status report. For example, an authorization to supply electric power to the propulsion system or receive a recharge may be revoked based upon failure to report a battery-history in accordance with an agreed upon schedule contained in the management criteria assigned to the identified rechargeable traction battery pack system.

In an embodiment, the compliance module 634 is further configured to evaluate an absence of a traction battery pack lease payment pertaining to the identified rechargeable traction battery pack system with respect to the management criteria. In an embodiment, the management instruction generated by the manager module 634 includes an instruction denying the identified rechargeable traction battery pack permission to supply electric power to the propulsion system. The denial is in response to an evaluation of the absence of a fraction battery pack lease payment. In an embodiment, the management instruction generated by the manager module includes an instruction denying the identified rechargeable traction battery pack supplying electric power to the propulsion system. For example, the denying or de-authorizing may be intermittent or conditional. For instance, a lease agreement may specify usage terms (i.e., limits on minimum charge level, on charging rates, on energy usage over time, etc.). For example, the manager module may de-authorize a use that would violate the lease agreement terms, while permitting another use within the lease agreement terms. In an embodiment, the management instruction generated by the manager module includes an instruction denying the identified rechargeable traction battery pack supplying electric power to the propulsion system. The denial is responsive to an evaluation of misuse in the battery status report. For example, misuse may include failing to stay within agreed upon charge/discharge parameters, or tampering with a gatekeeper module of the identified rechargeable traction battery pack system. In an embodiment, the management instruction generated by the manager module includes an instruction denying the identified rechargeable traction battery pack supplying electric power to the propulsion system. The denial is responsive to an evaluation of a time or geographical limit violation with respect to the management criteria respectively assigned to the identified rechargeable traction battery pack system. In an embodiment, the management instruction generated by the manager module includes an instruction denying the identified rechargeable traction battery pack receiving a recharge. In an embodiment, the management instruction generated by the manager module includes an instruction permitting the identified rechargeable traction battery pack to supply electric power to the propulsion system. In an embodiment, the management instruction generated by the manager module includes an instruction permitting the identified rechargeable traction battery pack to receive a recharge. In an embodiment, the manager module is configured to generate a management instruction or initiate a billing responsive to the evaluation of the battery status report. In an embodiment, the billing is at least partially based on an evaluation electric power supplied to the propulsion system of the vehicle. In an embodiment, the billing is at least partially based on an evaluation of a misuse in the battery status report.

In an embodiment, the traction battery pack 210 has a first owner and the vehicle 203 has a second owner. In an embodiment, the traction battery pack is leased from the first owner. In an embodiment, the battery manager system 600 is operated by the first owner. In an embodiment, the battery manager system is operated by a third-party having a contractual relationship with the first owner.

In an embodiment, the battery manager system 600 includes a computing device 642. In an embodiment, the computing device may be at least substantially similar to the computing environment 19 of FIG. 1 that includes the thin computing device 20, or may be at least similar to the thin computing device 20. In an embodiment, the computing device may be at least substantially similar to the general purpose computing environment 100 having general purpose computing device 110, or may be at least substantially similar to the general purpose computing device 110. In an embodiment, the electronics package includes a computer storage media 644. In an embodiment, the computer storage media may be at least substantially similar to the computer storage media described in conjunction with the general purpose computing device 110 of FIG. 2. In an embodiment, the electronics package includes a power supply 646.

In an alternative embodiment, a battery manager system includes an asset database. The asset database includes records related at least two rechargeable battery pack systems configured to supply electric power to a vehicle, and a management criteria respectively assigned to each rechargeable battery pack system. The battery manager system includes a compliance module configured to evaluate a battery pack status report pertaining to an identified rechargeable battery pack system of the least two rechargeable battery pack systems (hereafter "the identified rechargeable battery pack system"), the evaluation with respect to the management criteria assigned to the identified rechargeable battery pack system. The battery manager system includes a manager module configured to generate a management instruction responsive to the evaluation of the battery status report. The battery manager system includes a communication system configured communicate with the identified rechargeable battery pack system.

Figure 9:
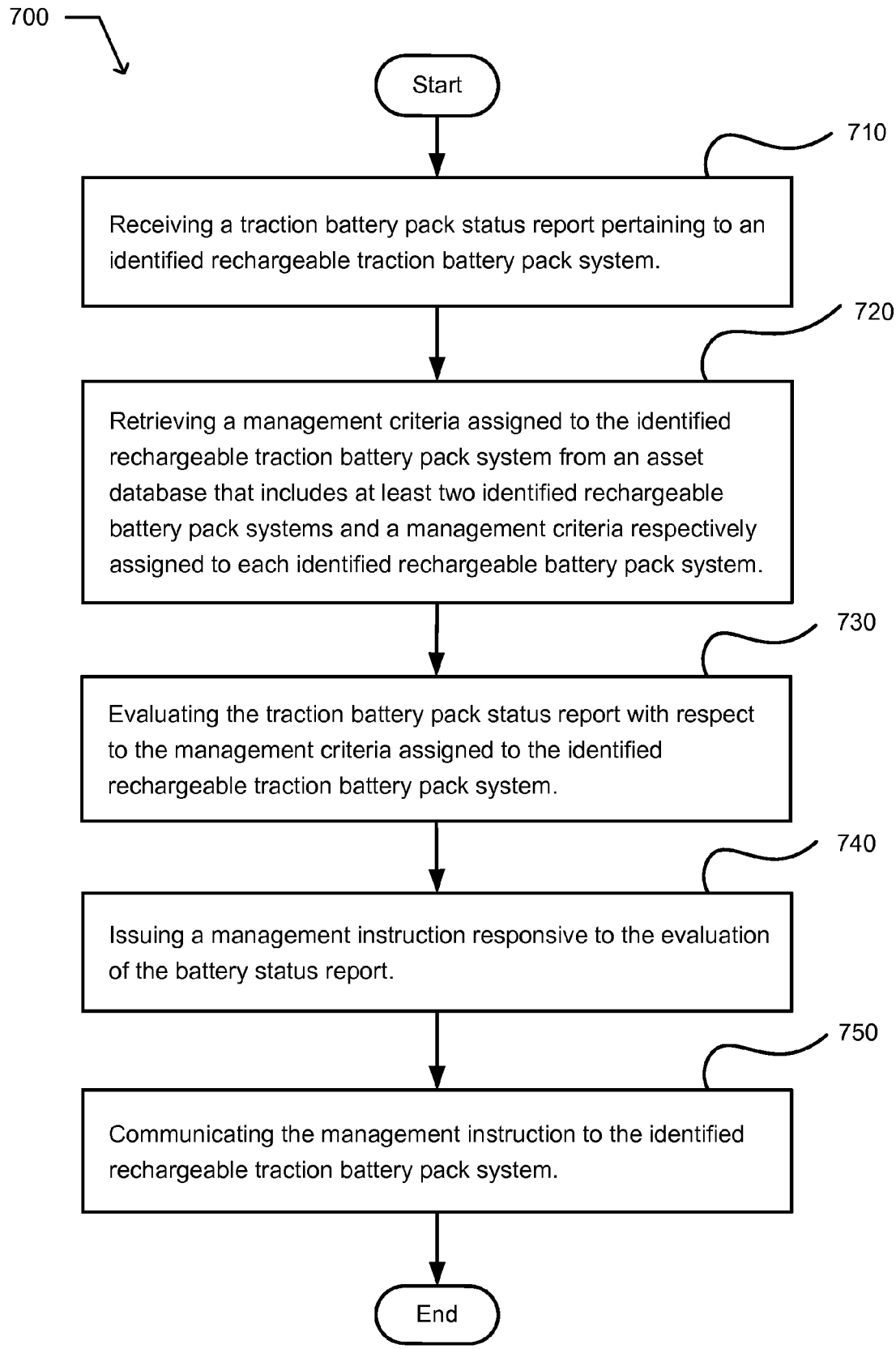
FIG. 9 illustrates an example operational flow 700.

FIG. 9 illustrates an example operational flow 700. After a start operation, the operational flow includes a reception operation 710. The reception operation includes receiving a traction battery pack status report pertaining to an identified rechargeable fraction battery pack system. In an embodiment, the reception operation may be implemented using the communication module 638 described in conjunction with FIG. 8. A fetch operation 720 includes retrieving a management criteria assigned to an identified rechargeable traction battery pack system from an asset database. The asset database includes at least two identified rechargeable traction battery pack systems and a management criteria respectively assigned to each identified rechargeable traction battery pack system. In an embodiment, the fetch operation may be implemented by computing device 642 fetching the management criteria assigned to the identified rechargeable traction battery pack system from an asset database saved in storage 644. An evaluation operation 730 includes evaluating the traction battery pack status report with respect to the management criteria assigned to the identified rechargeable traction battery pack system. In an embodiment, the evaluation operation may be implemented using the compliance module 634 described in conjunction with FIG. 8. A compliance operation 740 includes issuing a management instruction responsive to the evaluation of the battery status report. In an embodiment, the compliance operation may be implemented using the manager module 636 described in conjunction with FIG. 8. A transmission operation 750 includes communicating the management instruction to the identified rechargeable traction battery pack system. For example, the transmission operation may be implemented by the communication module 638 transmitting the management instruction to the communication system 236 of the rechargeable traction battery pack system 210. The operational flow includes an end operation.

In an embodiment of the reception operation 710, the receiving includes receiving a traction battery pack status report pertaining to an identified rechargeable traction battery pack system transmitted by a communications system mounted on a mobile electric vehicle. In an embodiment of the evaluation operation 730, the evaluating includes evaluating an absence of a traction battery pack status report pertaining to the identified rechargeable traction battery pack system with respect to the management criteria assigned to the identified rechargeable traction battery pack system. In an embodiment of the evaluation operation, the evaluating includes evaluating an absence of a traction battery pack lease payment pertaining to the identified rechargeable traction battery pack system with respect to the management criteria respectively assigned to the identified rechargeable traction battery pack system. In embodiment of the compliance operation 740, the issuing includes issuing a management instruction denying the identified rechargeable traction battery pack supplying electric power to the propulsion system. In embodiment of the compliance operation, the issuing includes issuing a management instruction permitting the identified rechargeable traction battery pack supplying electric power to the propulsion system.

In embodiment the traction battery pack has a first owner and the vehicle has a second owner. In embodiment, the traction battery pack is leased from the first owner.

Figure 10:
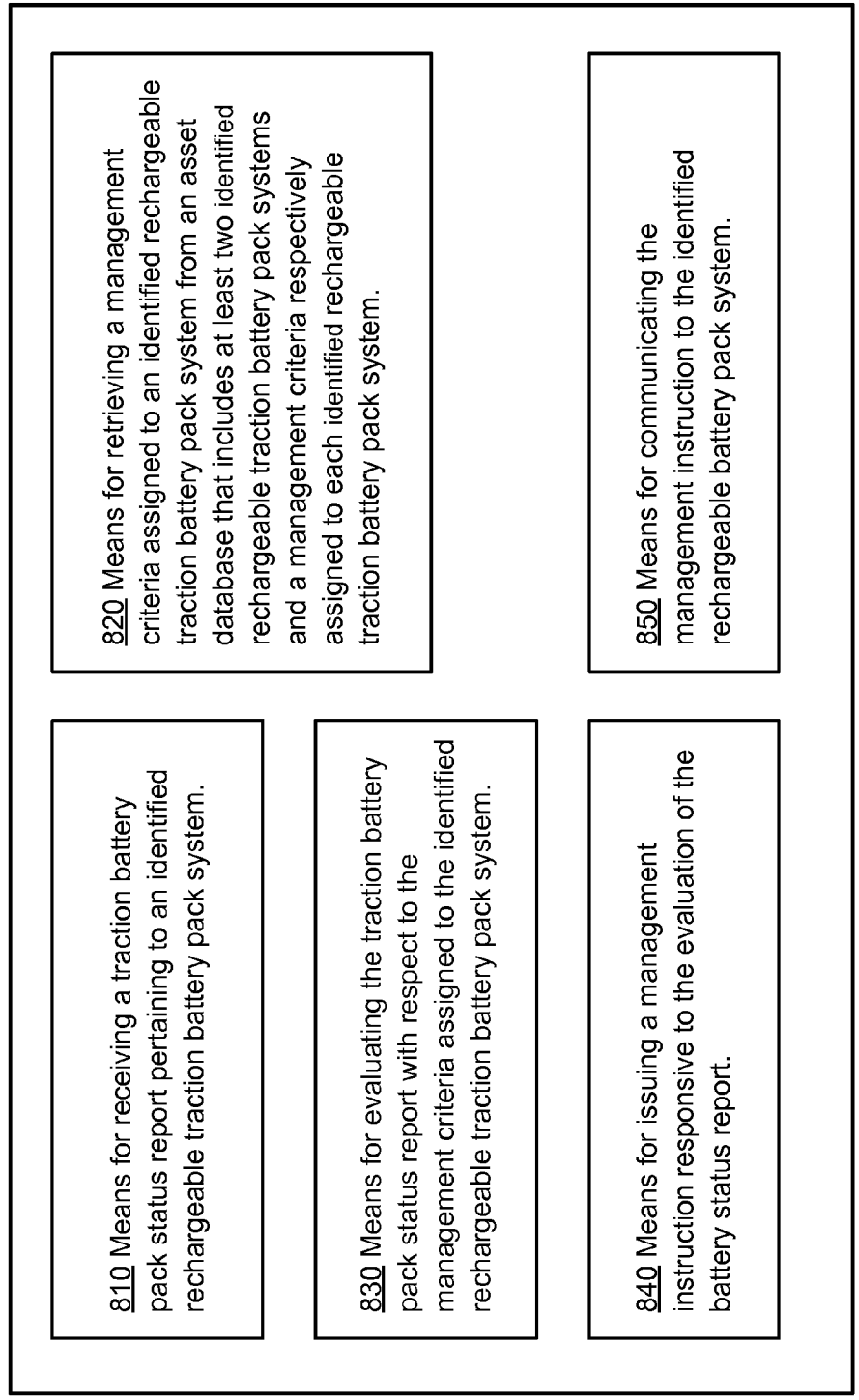
FIG. 10 illustrates a system 800.

FIG. 10 illustrates a system 800. The system includes means 810 for a receiving a traction battery pack status report pertaining to an identified rechargeable traction battery pack system. The system includes means 820 for retrieving management criteria assigned to an identified rechargeable traction battery pack system from an asset database. The data base includes at least two identified rechargeable fraction battery pack systems and a management criteria respectively assigned to each identified rechargeable traction battery pack system. The system includes means 830 for evaluating the traction battery pack status report with respect to the management criteria assigned to the identified rechargeable fraction battery pack system. The system includes means 840 for issuing a management instruction responsive to the evaluation of the battery status report. The system includes means 850 for communicating the management instruction to the identified rechargeable traction battery pack system.

All references cited herein are hereby incorporated by reference in their entirety or to the extent their subject matter is not otherwise inconsistent herewith.

In some embodiments, "configured" includes at least one of designed, set up, shaped, implemented, constructed, or adapted for at least one of a particular purpose, application, or function.

It will be understood that, in general, terms used herein, and especially in the appended claims, are generally intended as "open" terms. For example, the term "including" should be interpreted as "including but not limited to." For example, the term "having" should be interpreted as "having at least." For example, the term "has" should be interpreted as "having at least." For example, the term "includes" should be interpreted as "includes but is not limited to," etc. It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a receiver" should typically be interpreted to mean "at least one receiver"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "at least two chambers," or "a plurality of chambers," without other modifiers, typically means at least two chambers).

In those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable or physically interacting components or wirelessly interactable or wirelessly interacting components.

With respect to the appended claims the recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Use of "Start," "End," "Stop," or the like blocks in the block diagrams is not intended to indicate a limitation on the beginning or end of any operations or functions in the diagram. Such flowcharts or diagrams may be incorporated into other flowcharts or diagrams where additional functions are performed before or after the functions shown in the diagrams of this application. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A battery manager system comprising:
   an asset database that includes records related to at least two rechargeable traction battery pack systems and a management criteria respectively assigned to each rechargeable traction battery pack system;
   a compliance module configured to evaluate a traction battery pack status report pertaining to an identified rechargeable traction battery pack system of the at least two rechargeable traction battery pack systems (hereafter "the identified rechargeable traction battery pack system"), the evaluation with respect to the management criteria assigned to the identified rechargeable traction battery pack system;
   a manager module configured to generate a management instruction responsive to the evaluation of the battery status report; and
   a communication system configured to communicate with the identified rechargeable traction battery pack system.

2. The system of claim 1, wherein the traction battery pack status report is received from a remote electric vehicle battery system with respect to the management criteria.

3. The system of claim 1, wherein the compliance module is further configured to evaluate an absence of a traction battery pack status report pertaining to the identified rechargeable traction battery pack system with respect to the management criteria.

4. The system of claim 3, wherein the generated management instruction includes an instruction denying the identified rechargeable traction battery pack supplying electric power to the propulsion system in response to an evaluation of the absence of the traction battery pack status report.

5. The system of claim 1, wherein the compliance module is further configured to evaluate an absence of a traction battery pack lease payment pertaining to the identified rechargeable traction battery pack system with respect to the management criteria respectively assigned to the identified rechargeable traction battery pack system.

6. The system of claim 5, wherein the generated management instruction includes an instruction denying the identified rechargeable traction battery pack supplying electric power to the propulsion system in response to an evaluation of the absence of a traction battery pack lease payment.

7. The system of claim 1, wherein the generated management instruction includes an instruction denying the identified rechargeable traction battery pack supplying electric power to the propulsion system.

8. The system of claim 1, wherein the generated management instruction includes an instruction denying the identified rechargeable traction battery pack supplying electric power to the propulsion system responsive to an evaluation of misuse in the battery status report.

9. The system of claim 1, wherein the generated management instruction includes an instruction denying the identified rechargeable traction battery pack supplying electric power to the propulsion system responsive to an evaluation of a time or geographical limit violation with respect to the management criteria respectively assigned to the identified rechargeable traction battery pack system.

10. The system of claim 1, wherein the generated management instruction includes an instruction denying the identified rechargeable traction battery pack receiving a recharge.

11. The system of claim 1, wherein the generated management instruction includes an instruction permitting the identified rechargeable traction battery pack to supply electric power to the propulsion system.

12. The system of claim 1, wherein the generated management instruction includes an instruction permitting the identified rechargeable traction battery pack to receive a recharge.

13. The system of claim 1, wherein the manager module is configured to generate a management instruction or initiate a billing responsive to the evaluation of the battery status report.

14. The system of claim 13, wherein the billing is at least partially based on an evaluation electric power supplied to the propulsion system of the vehicle.

15. The system of claim 13, wherein the billing is at least partially based on an evaluation of a misuse in the battery status report.

16. The system of claim 1, wherein the generated management instruction includes an updated or replacement management criteria.

17. The method of claim 1, wherein the traction battery pack has a first owner and the vehicle has a second owner.

18. The system of claim 17, wherein the traction battery pack is leased from the first owner.

19. The method of claim 1, wherein communication system is configured to communicate with identified traction battery pack system using a wireless network.

20. The method of claim 1, wherein communication system is configured to communicate an authorization code to a user of the vehicle.

21. A battery manager system comprising:
   an asset database that includes records related to at least two rechargeable battery pack systems configured to supply electric power to a vehicle and a management criteria respectively assigned to each rechargeable battery pack system;
   a compliance module configured to evaluate a battery pack status report pertaining to an identified rechargeable battery pack system of the at least two rechargeable battery pack systems (hereafter "the identified rechargeable battery pack system"), the evaluation with respect to the management criteria assigned to the identified rechargeable battery pack system;

a manager module configured to generate a management instruction responsive to the evaluation of the battery status report; and a communication system configured to communicate with the identified rechargeable battery pack system.

* * * * *

UNITED STATES PATENT AND TRADEMARK OFFICE
CERTIFICATE OF CORRECTION

Page 1 of 1

PATENT NO. : 9,994,119 B2
APPLICATION NO. : 13/900337
DATED : June 12, 2018
INVENTOR(S) : William D. Duncan, Roderick A. Hyde and Jordin T. Kare It is certified that error appears in the above-identified patent and that said Letters Patent is hereby corrected as shown below:

On the Title Page

Item (57), Line 7:
"evaluate a fraction battery" should read --evaluate a traction battery--

Item (57), Line 11:
"rechargeable fraction battery" should read --rechargeable traction battery--

Item (57), Line 13:
"rechargeable fraction battery" should read --rechargeable traction battery--

Signed and Sealed this
Seventh Day of August, 2018

Andrei Iancu
*Director of the United States Patent and Trademark Office*